United States Patent
Matsuya et al.

(10) Patent No.: US 11,158,858 B2
(45) Date of Patent: Oct. 26, 2021

(54) POSITIVE ELECTRODE STRUCTURE FOR SECONDARY CELL

(71) Applicant: NGK INSULATORS, LTD., Nagoya (JP)

(72) Inventors: Junki Matsuya, Nagoya (JP); Kenshin Kitoh, Nagoya (JP); Takeshi Yagi, Toyohashi (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/206,272

(22) Filed: Mar. 19, 2021

(65) Prior Publication Data

US 2021/0210764 A1    Jul. 8, 2021

Related U.S. Application Data

(63) Continuation-in-part of application No. PCT/JP2019/032601, filed on Aug. 21, 2019.

(30) Foreign Application Priority Data

Dec. 7, 2018    (JP) .............................. JP2018-230188

(51) Int. Cl.

| H01M 50/417 | (2021.01) |
| H01M 4/52 | (2010.01) |
| H01M 4/80 | (2006.01) |
| H01M 4/62 | (2006.01) |
| H01M 4/66 | (2006.01) |
| H01M 50/449 | (2021.01) |
| H01M 10/30 | (2006.01) |
| H01M 4/13 | (2010.01) |

(Continued)

(52) U.S. Cl.
CPC ............. *H01M 4/628* (2013.01); *H01M 4/13* (2013.01); *H01M 4/52* (2013.01); *H01M 4/661* (2013.01);

(Continued)

(58) Field of Classification Search
None
See application file for complete search history.

(56) References Cited

U.S. PATENT DOCUMENTS

| 9,293,791 B2 | 3/2016 | Yamada et al. |
| 10,290,847 B2 | 5/2019 | Kitoh et al. |

(Continued)

FOREIGN PATENT DOCUMENTS

| JP | 2000-208138 A1 | 7/2000 |
| JP | 2016-038995 A1 | 3/2016 |

(Continued)

OTHER PUBLICATIONS

International Search Report (Application No. PCT/JP2019/032601) dated Nov. 12, 2019 (with English translation).

(Continued)

*Primary Examiner* — Tracy M Dove
(74) *Attorney, Agent, or Firm* — Burr & Brown, PLLC (57) ABSTRACT

Provided is a positive electrode structure including: a positive electrode current collector composed of a tabular nickel foam and having a tabular coated portion and an uncoated portion extending from an outer peripheral portion of the coated portion; a positive electrode active material containing nickel hydroxide and/or nickel oxyhydroxide incorporated into the coated portion of the positive electrode current collector; and a nonwoven fabric made of a polymer material and covering the coated portion of the positive electrode current collector from both sides. The positive electrode active material is not present in the uncoated portion of the positive electrode current collector. The nonwoven fabric covers an entirety of the coated portion and extends from the outer peripheral portion of the coated portion to form a surplus region, and the surplus region is sealed so as to close all around the outer peripheral portion of the coated portion.

26 Claims, 3 Drawing Sheets

(51) Int. Cl.
　　　*H01M 4/38*　　　(2006.01)
　　　*H01M 4/36*　　　(2006.01)
(52) U.S. Cl.
　　　CPC ........... *H01M 4/808* (2013.01); *H01M 10/30* (2013.01); *H01M 50/417* (2021.01); *H01M 50/449* (2021.01); *H01M 4/364* (2013.01); *H01M 4/38* (2013.01); *H01M 2300/0014* (2013.01)

(56) References Cited

U.S. PATENT DOCUMENTS

| 10,686,177 | B2 | 6/2020 | Gonda et al. |
| 2017/0214019 | A1 | 7/2017 | Yokoyama et al. |
| 2019/0267597 | A1 | 8/2019 | Gonda et al. |

FOREIGN PATENT DOCUMENTS

| JP | 2016-103450 | A1 | 6/2016 |
| JP | 2018-029045 | A1 | 2/2018 |
| WO | 2013/118561 | A1 | 8/2013 |
| WO | 2016/067884 | A1 | 5/2016 |
| WO | 2016/076047 | A1 | 5/2016 |
| WO | 2017/086278 | A1 | 5/2017 |
| WO | 2018/105178 | A1 | 6/2018 |

OTHER PUBLICATIONS

International Written Opinion (Application No. PCT/JP2019/032601) dated Nov. 12, 2019 (with English translation).

English translation of the Written Opinion of the International Search Authority (Chapter I) dated Nov. 12, 2019.

POSITIVE ELECTRODE STRUCTURE FOR SECONDARY CELL

CROSS-REFERENCE TO RELATED APPLICATIONS

This application is a continuation-in-part application of PCT/JP2019/032601 filed Aug. 21, 2019, which claims priority to Japanese Patent Application No. 2018-230188 filed Dec. 7, 2018, the entire contents all of which are incorporated herein by reference.

BACKGROUND OF THE INVENTION

1. Field of the Invention

The present invention relates to a positive electrode structure for a secondary battery.

2. Description of the Related Art

In order to obtain a high voltage and a large current, laminated batteries made by combining a plurality of cells are widely used. Laminated batteries have a configuration in which a laminated body in which a plurality of cells are connected in series or in parallel is accommodated in one battery container. For example, Patent Literature 1 (WO2017/086278) discloses a zinc secondary battery in which a plurality of electrode cartridges including electrodes and separators (particularly LDH separators described later) are housed in a closed container. In the laminated battery disclosed in Patent Literature 1, the positive electrode plate, the separator, and the negative electrode plate are housed in a closed container in an upright state, and a nonwoven fabric is provided between the positive electrode plate and the separator and/or between the negative electrode plate and the separator. By providing the nonwoven fabric in this manner, various functions of a cushioning material, a liquid-retaining material, a falling-off preventive material, an air bubble escape material, and the like can be exhibited, so that the electrolytic solution can be sufficiently brought into contact with the separator to be held while preventing the falling-off of constituent particles from the positive electrode plate and the negative electrode plate and/or releasing the bubbles which may be generated, thereby maximizing the hydroxide ion conductivity of the separator.

For zinc secondary batteries such as a nickel-zinc secondary battery or an air-zinc secondary battery, it is known that metal zinc is deposited in a dendritic form from a negative electrode during charging, and the deposited zinc penetrates through voids of a separator such as a nonwoven fabric to reach a positive electrode, thereby causing a short circuit. Short circuit caused by such zinc dendrites reduces the charge/discharge repetition lifetime. In order to deal with the above problems, a battery provided with a layered double hydroxide (LDH) separator that selectively permeates hydroxide ions and blocks the penetration of zinc dendrites has been proposed. For example, Patent Literature 2 (WO2013/118561) discloses that an LDH separator is provided between a positive electrode and a negative electrode in a nickel-zinc secondary battery. Further, Patent Literature 3 (WO2016/076047) discloses a separator structure including an LDH separator fitted in or joined to a resin outer frame, and discloses that the LDH separator is so dense that it has gas impermeability and/or water impermeability. The literature also discloses that LDH separator can be in the form of a composite with a porous substrate. Furthermore, Patent Literature 4 (WO2016/067884) discloses various methods for forming an LDH dense membrane on a surface of a porous substrate to obtain a composite material (LDH separator). The methods include uniformly depositing, on the porous substrate, a starting material capable of providing a start point of the growth of LDH crystals and hydrothermally treating the porous substrate in an aqueous stock solution to form the layered double hydroxide dense membrane on the surface of the porous substrate.

CITATION LIST

Patent Literature

Patent Literature 1: WO2017/086278
Patent Literature 2: WO2013/118561
Patent Literature 3: WO2016/076047
Patent Literature 4: WO2016/067884

SUMMARY OF THE INVENTION

When a nonwoven fabric is provided on a positive electrode plate, it is considered to sandwich the positive electrode plate with the nonwoven fabric from both sides and seal the end portions of the nonwoven fabric by heat welding or the like, in order to effectively obtain various functions of the nonwoven fabric (functions of a cushioning material, a liquid-retaining material, a falling-off preventive material, an air bubble escape material, etc.). In this case, in the positive electrode structure in which the positive electrode current collecting tab extends from the end portion of the positive electrode plate, heat welding sealing has not been hitherto performed in the portion in which the positive electrode current collecting tab and the nonwoven fabric overlap each other because direct heat welding between the nonwoven fabrics is difficult due to the interposition of the positive electrode current collecting tab, and because interference with the current collector is to be avoided. However, it has been found that when a nickel-zinc battery is produced by heat welding sealing only three sides of the four outer peripheral sides of the nonwoven fabric actually sandwiching the positive electrode plate, other than one side overlapped with the positive electrode current collecting tab (that is, one side remains open), the self-discharge reaction progresses, and the target voltage cannot be obtained.

The present inventors have recently found that by covering a coated portion of a positive electrode current collector incorporating a positive electrode active material with a nonwoven fabric from both sides and sealing a surplus region of the nonwoven fabric so as to close all around an outer peripheral portion of the coated portion, it is possible to provide a positive electrode structure capable of suppressing a self-discharge reaction and obtaining a target voltage when incorporated into a secondary battery.

Therefore, an object of the present invention is to provide a positive electrode structure capable of suppressing a self-discharge reaction and obtaining a target voltage when incorporated into a secondary battery.

According to an aspect of the present invention, there is provided a positive electrode structure for a secondary battery, comprising:
- a positive electrode current collector composed of a tabular nickel foam and having a tabular coated portion and an uncoated portion extending from an outer peripheral portion of the coated portion;
- a positive electrode active material containing nickel hydroxide and/or nickel oxyhydroxide, the positive electrode active material being incorporated into the coated portion of the positive electrode current collector; and a nonwoven fabric made of a polymer material and covering the coated portion of the positive electrode current collector from both sides, wherein the positive electrode active material is not present in the uncoated portion of the positive electrode current collector, and wherein the nonwoven fabric covers an entirety of the coated portion and extends from the outer peripheral portion of the coated portion to form a surplus region, and the surplus region is sealed so as to close all around the outer peripheral portion of the coated portion.

According to another aspect of the present invention, there is provided a nickel-zinc secondary battery comprising:

the positive electrode structure, a negative electrode structure containing a negative electrode active material layer containing at least one selected from the group consisting of zinc, zinc oxide, a zinc alloy, and a zinc compound;

an LDH separator containing a porous substrate made of a polymer material, and a layered double hydroxide (LDH) and/or an LDH-like compound that fills up pores of the porous substrate so as to exhibit hydroxide ion conductivity and gas impermeability; and an electrolytic solution, wherein the positive electrode and the negative electrode active material layer are separated from each other via the LDH separator.

DETAILED DESCRIPTION OF THE INVENTION

Figure 1:
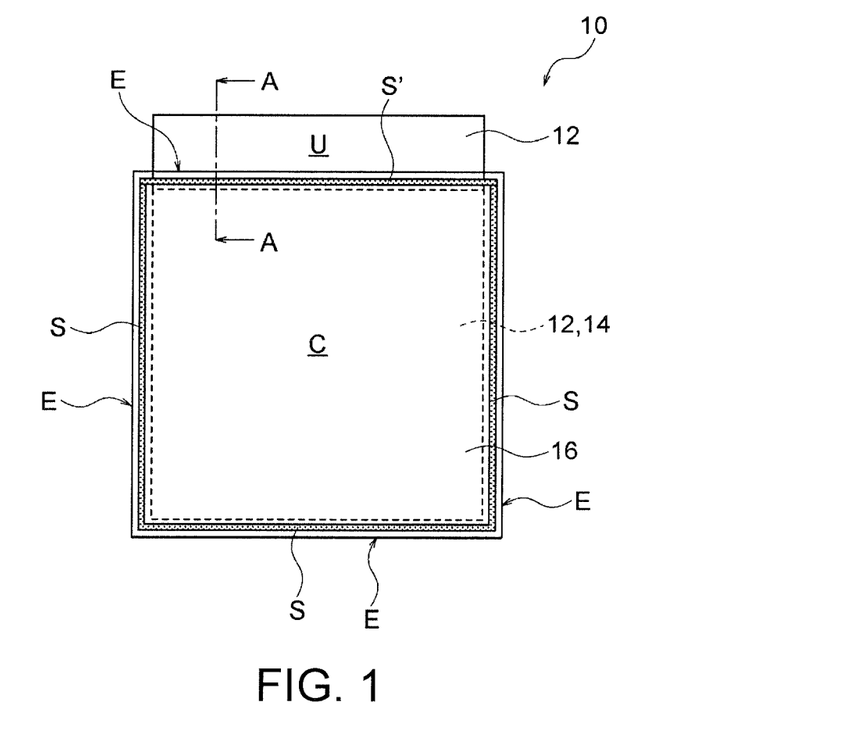
FIG. 1 is a front view showing a positive electrode structure according to an aspect of the present invention.

A positive electrode structure of the present invention is used for a secondary battery, preferably a nickel-zinc secondary battery. FIG. 1 shows an example of the positive electrode structure of the present invention. The positive electrode structure 10 shown in FIG. 1 includes a positive electrode current collector 12, a positive electrode active material 14, and a nonwoven fabric 16. The positive electrode current collector 12 is composed of a tabular nickel foam, and has a tabular coated portion C and an uncoated portion U extending from an outer peripheral portion of the coated portion C. The positive electrode active material 14 contains nickel hydroxide and/or nickel oxyhydroxide, and is incorporated into the coated portion C of the positive electrode current collector 12. The nonwoven fabric 16 is made of a polymer material and covers the coated portion C of the positive electrode current collector 12 from both sides. The positive electrode active material 14 is not present in the uncoated portion U of the positive electrode current collector 12. The nonwoven fabric 16 covers the entirety of the coated portion C and extends from the outer peripheral portion of the coated portion C to form a surplus region E, and the surplus region E is sealed so as to close all around the outer peripheral portion of the coated portion C. In this way, by covering the coated portion C of the positive electrode current collector 12 incorporating the positive electrode active material 14 with the nonwoven fabric 16 from both sides and sealing the surplus region E of the nonwoven fabric 16 so as to close all around the outer peripheral portion of the coated portion C, it is possible to provide a positive electrode structure 10 capable of suppressing a self-discharge reaction and obtaining a target voltage when incorporated into a secondary battery.

Figure 2:
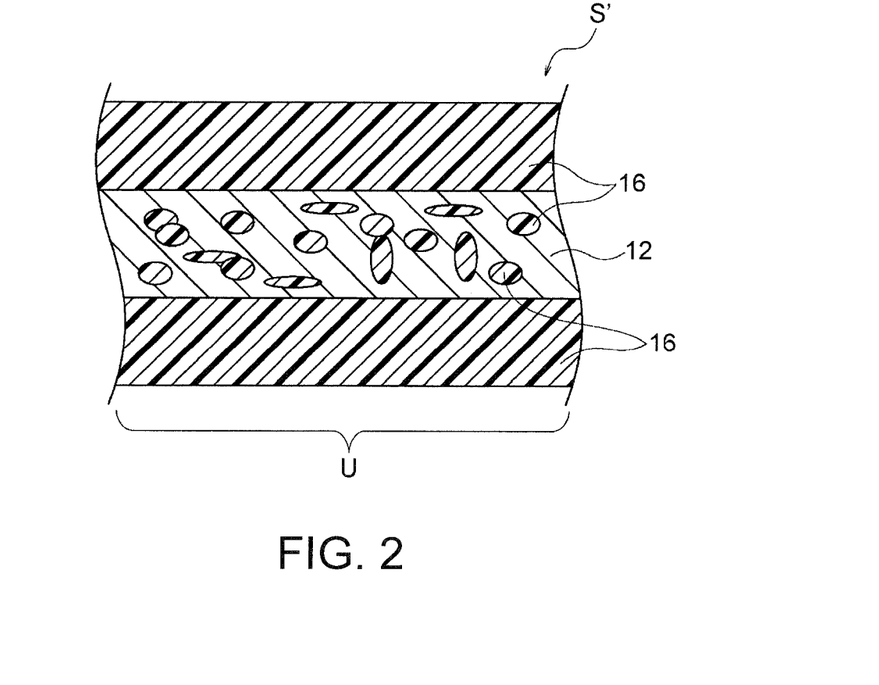
FIG. 2 is a cross-sectional view schematically showing a heat welding sealing structure of a nonwoven fabric/positive electrode current collector/nonwoven fabric at a sealing side S' of the positive electrode structure shown in FIG. 1.

That is, as described above, when a nonwoven fabric is provided on a positive electrode plate, it is considered to sandwich the positive electrode plate with the nonwoven fabric from both sides and seal the end portions of the nonwoven fabric by heat welding or the like, in order to effectively obtain various functions of the nonwoven fabric (functions of a cushioning material, a liquid-retaining material, a falling-off preventive material, an air bubble escape material, etc.). In this case, it has been found that when a nickel-zinc battery is produced by heat welding sealing only three sides S of the four outer peripheral sides of the nonwoven fabric sandwiching the positive electrode plate, other than one side overlapped with the positive electrode current collector (that is, one side O remains open) based on the conventional idea described above, as shown in FIG. 5, the self-discharge reaction progresses, and the target voltage cannot be obtained. That is, it has been found that the coated positive electrode active material (for example, the nickel component) falls off from the positive electrode current collector during aging and evaluation and diffuses to the outside from the open side O where the nonwoven fabric is not sealed (arrow direction in the figure), thereby reaching the negative electrode and forming a local battery, causing a self-discharge reaction of the negative electrode, and causing a problem in that the target voltage cannot be obtained. Therefore, nickel foam is adopted as the positive electrode current collector 12, the nonwoven fabric 16 is extended from the outer peripheral portion of the coated portion C to form the surplus region E, and as shown in FIG. 2, the whole positive electrode current collector 12 is sealed with the nonwoven fabric 16 from both sides of the positive electrode current collector 12. In this regard, a normal positive electrode current collector composed of a nonporous metal plate cannot be heat-welded in the form of being sandwiched between nonwoven fabrics, but by adopting the nickel foam, a large number of voids are allowed to be present in the positive electrode current collector 12 as shown in FIG. 2, and when the nonwoven fabric 16 is melted, the nonwoven fabrics 16 can be heat-welded to each other through the voids in the positive electrode current collector 12, thereby realizing effective sealing. However, it is considered that even if a sealing method other than heat welding such as an adhesive or ultrasonic welding is used, the sealing can be similarly performed by using a large number of voids. In this way, by sealing not only the side S that does not overlap with the positive electrode current collector 12 of the nonwoven fabric 16 but also the side S' that overlaps with the positive electrode current collector 12 of the nonwoven fabric 16, the nickel component or the like fallen off from the positive electrode does not diffuse outside, and the self-discharge reaction can be suppressed to obtain the target voltage.

The positive electrode current collector 12 is composed of nickel foam. The nickel foam is a porous metal body composed of nickel and having open pore structures. The nickel foam has a tabular outer shape, preferably a rectangular shape (for example, a quadrilateral shape) for use as the positive electrode current collector 12. As used herein, the term "tabular" does not have to be a perfect tabular, and changes in thickness (for example, a step or a tapered thickness change at the boundary between the coated portion C and the uncoated portion U) such as steps and undulations are allowed as long as the tabular outline is generally recognized. As used herein, the term "rectangular" or "quadrilateral" does not have to be a perfect rectangular or quadrilateral, and there may be some deformation such as cutouts or rounded corners as long as the rectangular or quadrilateral outline is generally recognized. Commercially available nickel foam may be used as the positive electrode current collector 12, and examples thereof include Celmet® manufactured by Sumitomo Electric Industries, Ltd. Nickel foams of various specifications are commercially available, and the thickness, average pore diameter, average window diameter, and the like may be appropriately selected according to the desired thickness and performance. For example, nickel foam having a thickness of 0.5 to 10 mm, an average pore diameter of 0.3 to 5 mm, and an average window diameter of 0.2 to 2 mm can be preferably used. It should be noted that these numeral values of the thickness, the average pore diameter, and the average window diameter are not the numerical values which the positive electrode structure 10 as a final form has because they vary with the filling of the positive electrode active material 14 and the subsequent pressing.

The positive electrode current collector 12 has a tabular coated portion C and an uncoated portion U extending from the outer peripheral portion of the coated portion C (typically one side). The coated portion C is a portion for incorporating the positive electrode active material 14, and the uncoated portion U is a portion left without incorporating the positive electrode active material 14. Therefore, in the positive electrode structure 10, the positive electrode active material is not present in the uncoated portion U of the positive electrode current collector 12. Therefore, the uncoated portion U of the positive electrode current collector 12 is suitable for connecting the positive electrode terminals by welding or the like.

The positive electrode active material 14 contains nickel hydroxide and/or nickel oxyhydroxide. Therefore, the secondary battery of the present invention is particularly suitable for a nickel-zinc secondary battery. Filling the coated portion C of the positive electrode current collector 12 with the positive electrode active material 14 can be performed as follows. For example, a positive electrode active material paste containing an active material powder containing nickel hydroxide as a main component and a binder or the like is filled into the pores of the coated portion C of the positive electrode current collector 12 and dried. At the time of filling, in order to prevent the paste from entering the uncoated portion U of the positive electrode current collector 12, it is preferable to apply masking or the like beforehand to a place where the paste should not be filled to block the pores. Then, after the coated portion C filled with the positive electrode active material paste is sufficiently dried, it is uniformly pressurized with a roll press to adjust the thickness to a desired value. By pressing the coated portion C after drying, it is possible to prevent the electrode active material from falling off and improve the electrode density. It is preferable to adjust the preparation conditions of the paste and the roll press conditions appropriately so as to obtain a desired density.

The positive electrode current collector 12 incorporating the positive electrode active material 14 preferably has a thickness (that is, $T_C$ in FIG. 4) of 0.2 to 2.0 mm, more preferably 0.4 to 1.4 mm, and still more preferably 0.6 to 0.8 mm. As used herein, the "thickness of the positive electrode current collector 12 incorporating the positive electrode active material 14" means the thickness of the entire positive electrode plate composed of the positive electrode active material 14 and the positive electrode current collector 12, including not only the thickness of the positive electrode current collector 12 containing the positive electrode active material 14 inside thereof but also the thickness of the positive electrode active material 14 adhering to the surface of the positive electrode current collector 12.

As described above, the positive electrode active material is not present in the uncoated portion U of the positive electrode current collector 12. The uncoated portion U is preferably adjusted to have a desired thickness by pressing with a uniaxial press, a roll press or the like, as necessary. The uncoated portion U of the positive electrode current collector 12 preferably has a thickness of 0.1 to 1.0 mm, more preferably 0.1 to 0.5 mm, and still more preferably 0.1 to 0.2 mm. In such a range, it is easy to perform heat welding sealing with the nonwoven fabric 16 using the pores of the nickel foam, and furthermore, easy to weld the positive electrode terminals.

The nonwoven fabric 16 is a nonwoven fabric made of a polymer material. The nonwoven fabric 16 effectively provide various functions of the nonwoven fabric (functions of a cushioning material, a liquid-retaining material, a falling-off preventive material, an air bubble escape material, etc.) by covering the coated portion C of the positive electrode current collector 12 from both sides. That is, since the nonwoven fabric can exhibit various functions of a cushioning material, a liquid-retaining material, a falling-off preventive material, an air bubble escape material, and the like, the electrolytic solution can be sufficiently brought into contact with the positive electrode active material 14 and the separator to be held while preventing the falling-off of constituent particles from the positive electrode and/or releasing the bubbles which may be generated. The polymer material constituting the nonwoven fabric is preferably a thermoplastic polymer material from the viewpoint of performing heat welding sealing. Examples of the thermoplastic polymer material include polyethylene, polypropylene, and polyester, and particularly preferred is polyethylene and/or polypropylene. The nonwoven fabric 16 preferably has a thickness of 0.05 to 0.2 mm, more preferably 0.07 to 0.15 mm, and still more preferably 0.08 to 0.10 mm from the viewpoint of the above-described various functions (particularly liquid retention) of the nonwoven fabric and ease of sealing (particularly heat welding sealing). Commercially available nonwoven fabric 16 may be used, and the basis weight and thickness may be appropriately selected in consideration of water absorption rate, water retention, and the like so as to obtain desired characteristics. The nonwoven fabric 16 to which hydrophilicity is imparted by surfactants, plasma treatments or the like is preferred.

As shown in FIG. 1, the nonwoven fabric 16 covers the entirety of the coated portion C and extends from the outer peripheral portion of the coated portion C to form a surplus region E, and the surplus region E is sealed so as to close all around the outer peripheral portion of the coated portion C.

Figure 4:
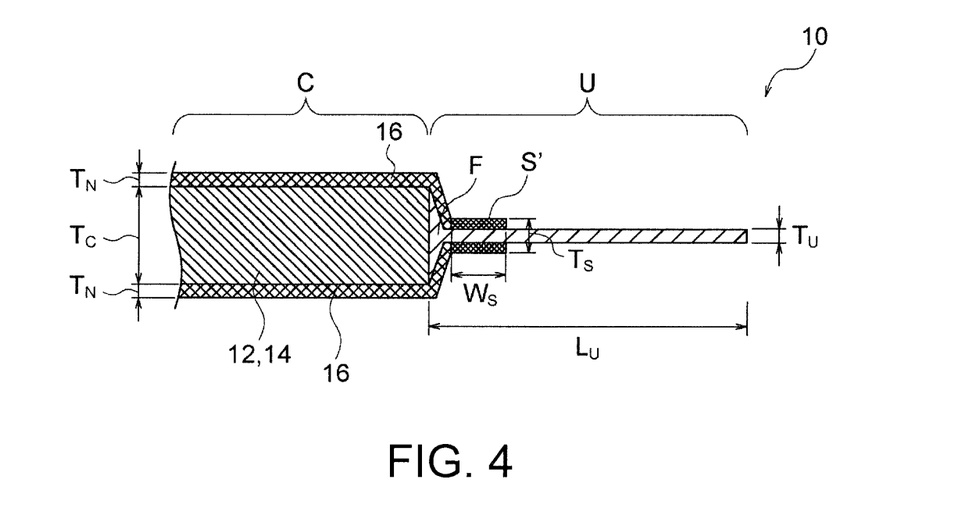
FIG. 4 is a cross-sectional view taken along a line A-A of the positive electrode structure shown in FIG. 1, and is a view corresponding to the positive electrode structure in which heat welding sealing has been completed for the laminated body shown in FIG. 3.

As shown in FIGS. 1, 2, and 4, in the portion of the surplus region E that overlaps with the uncoated portion U, the nonwoven fabric 16 is preferably sealed while the positive electrode current collector 12 being sandwiched therebetween. In this case, the portion in which the nonwoven fabric 16 is sealed while the positive electrode current collector 12 being sandwiched therebetween has a width $W_S$ of 1 to 10 mm, more preferably 1 to 7 mm, and still more preferably 1 to 4 mm. Further, the portion in which the nonwoven fabric 16 is sealed while the positive electrode current collector 12 being sandwiched therebetween preferably has a thickness $T_s$ of 0.1 to 1.0 mm, more preferably 0.1 to 0.7 mm, and still more preferably 0.1 to 0.4 mm. As shown in FIG. 2, in the portion in which the nonwoven fabric 16 is sealed while the positive electrode current collector 12 being sandwiched therebetween, pores of the nickel foam constituting the positive electrode current collector 12 are preferably filled with a polymer material constituting the nonwoven fabric 16 (that is, polymer material in a molten and solidified state derived from the nonwoven fabric 16). Furthermore, as shown in FIG. 4, it is preferable that the positive electrode structure 10 has an unfilled region F between the coated portion C and the portion (side S') in which the nonwoven fabric 16 is sealed while the positive electrode current collector 12 being sandwiched therebetween, and in the unfilled region F, pores of the nickel foam constituting the positive electrode current collector 12 are not filled with the polymer material (that is, the constituent material of the nonwoven fabric 16) or the positive electrode active material. The unfilled region F functions as a buffer for sufficiently separating the coated portion C from the portion (side S') in which the nonwoven fabric 16 is sealed while the positive electrode current collector 12 being sandwiched therebetween, effectively preventing the positive electrode active material 14 from entering the seal portion from the coated portion C, and further ensuring the sealing of the nonwoven fabric 16 via the positive electrode current collector 12. Further, the presence of the unfilled region F makes it possible to avoid contact with the coated portion C when the uncoated portion U is pressurized.

Figure 3:
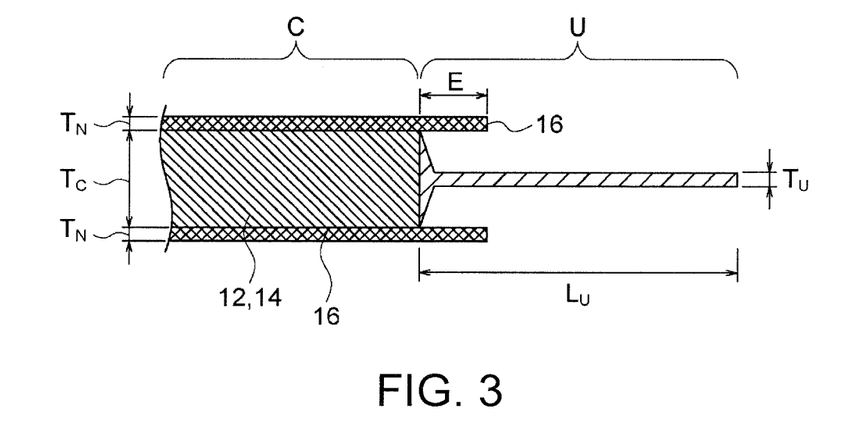
FIG. 3 is a cross-sectional view schematically showing a laminated body before heat welding sealing a nonwoven fabric in production of the positive electrode structure shown in FIG. 1.

As shown in FIGS. 3 and 4, in the portion of the surplus region E that overlaps with the uncoated portion U, the positive electrode structure 10 preferably has a tapered cross-sectional shape which has a thickness decreasing from the coated portion C toward the uncoated portion. With such a cross-sectional shape, it is possible to effectively prevent the breakage of the nickel foam due to the rapid thickness change at the boundary between the coated portion C and the uncoated portion U during the press working of the nickel foam (that is, when the uncoated portion U is pressed), and the breakage of the nonwoven fabric 16 at the boundary between the coated portion C and the uncoated portion U during the sealing of the nonwoven fabric 16.

On the contrary, in the portion (side S) of the surplus region E that does not overlap with the uncoated portion U, the nonwoven fabric 16 is preferably sealed while the positive electrode current collector 12 not being sandwiched therebetween. Since the nonwoven fabrics 16 can be directly sealed without interposing the positive electrode current collector 12, the sealing becomes easy.

In a particularly preferred embodiment of the present invention, as shown in FIG. 1, the nickel foam is rectangular (for example, quadrilateral), the nonwoven fabric 16 covers the entirety of the coated portion C and extends from four outer peripheral sides of the coated portion C to form the surplus region E, and the surplus region E is sealed so as to close the four outer peripheral sides S and S' of the coated portion C.

The sealing in the surplus region E can be performed by a known method such as an adhesive, heat welding, ultrasonic welding, adhesive tape, sealing tape, or the like, but heat welding sealing is preferable. By employing the heat welding sealing, it is possible to easily seal the positive electrode current collector 12 using a commercially available heat seal bar, and as described above with reference to FIG. 2, it is advantageous to seal the whole positive electrode current collector 12 with the nonwoven fabric 16 from both sides of the positive electrode current collector 12. That is, when the nonwoven fabric 16 is melted, the nonwoven fabrics 16 can be heat-welded to each other through the voids in the positive electrode current collector 12, thereby realizing effective sealing. For example, the heat welding sealing of the nonwoven fabric 16 may be performed by sandwiching the coated portion C from both sides with the nonwoven fabric 16 which has been cut out to a size larger than the coating portion C (see, for example, FIG. 3), and thermocompression-bonded the surplus region E protruding from the coated portion C at the end portion of the nonwoven fabric 16 with a heat seal bar or the like (see, for example, FIG. 4). Thermocompression bonding is preferably performed by pressing at a heating temperature of 150 to 200° C. for 1 second or longer.

As described above, the positive electrode structure 10 of the present invention is preferably used for a nickel-zinc secondary battery. In this case, the nickel-zinc secondary battery contains the above-mentioned positive electrode structure 10, a negative electrode structure, an LDH separator, and an electrolytic solution, and the positive electrode and the negative electrode active material layer are separated from each other via the LDH separator. The negative electrode structure contains a negative electrode active material layer containing at least one selected from the group consisting of zinc, zinc oxide, zinc alloys, and zinc compounds, and optionally further contains a negative electrode current collector. Preferred examples of the negative electrode active material include zinc oxide, zinc metal, and calcium zincate, but more preferred is a mixture of zinc metal and zinc oxide. The electrolytic solution preferably contains an aqueous alkali metal hydroxide solution. Examples of the alkali metal hydroxide include potassium hydroxide, sodium hydroxide, lithium hydroxide, and ammonium hydroxide and the like, but more preferred is potassium hydroxide.

The LDH separator is defined as a separator containing a layered double hydroxide (LDH) and/or an LDH-like compound (collectively referred to as a "hydroxide-ion conductive layered compound"), which selectively passes hydroxide ions by solely utilizing the hydroxide ion conductivity of the hydroxide-ion conductive layered compound. The term "LDH-like compound" as used herein means a hydroxide and/or an oxide with a layered crystal structure analogous to LDH, which may not be called LDH, and can be said to be an equivalent of LDH. However, as a broad definition, "LDH" can be interpreted to include not only LDH but also LDH-like compounds. Preferred LDH separators contain LDH and/or LDH-like compound and a porous substrate. As described above, the LDH and/or LDH-like compound fills up the pores of the porous substrate so that the LDH separator exhibits hydroxide ion conductivity and gas impermeability (and therefore functions as an LDH separator exhibiting hydroxide ion conductivity). The porous substrate is preferably made of a polymer material, and LDH is particularly preferably incorporated over the entire thickness direction of the porous substrate made of a polymer material. For example, known LDH separators as disclosed in Patent Literatures 2 to 4 can be used.

When housed in a closed container and sealed with a lid portion, a cell element including the positive electrode structure 10, a negative electrode structure, an LDH separator, and an electrolytic solution can function as a main constituent component of a sealed zinc secondary battery. It is more preferable to have a plurality of cell elements housed in a closed container to form an assembled battery.

EXAMPLES

The present invention will be described in more detail with reference to the following examples.

Example 1

(1) Production of Positive Electrode Structure

A positive electrode active material powder containing nickel hydroxide as a main component and a binder were mixed to prepare a positive electrode paste. A rectangular tabular nickel foam (Celmet® manufactured by Sumitomo Electric Industries, Ltd., product number #7, thickness 1.6 mm, average pore diameter 0.51 mm, average window diameter 0.26 mm) was provided as the positive electrode current collector, and the pores of the portion to be a coated portion of the nickel foam was filled with the positive electrode paste and dried. At this time, by applying masking to the portion to be an uncoated portion of the nickel foam beforehand to block the pores, the positive electrode paste was prevented from entering the pores of the uncoated portion. In this way, nickel foam (positive electrode current collector) partly filled with the positive electrode active material was obtained as a positive electrode plate. The obtained positive electrode plate was sufficiently dried and uniformly pressed by a roll press to reduce the thickness of the coated portion to 0.70 mm. At this time, the uncoated portion of nickel foam (the portion not filled with the positive electrode active material) was also compressed to some extent, but in order to selectively further compress the uncoated portion U, a roll press was performed under conditions of a hydraulic pressure of 0.1 MPa and a gap of 0.06 mm to reduce the thickness of the uncoated portion to 0.10 mm. In this way, a positive electrode plate having a cross-sectional shape as shown in FIG. 3 was obtained. The length $L_U$ of the uncoated portion U (that is, the length of the protrusion from the coated portion C) was 30 mm.

A commercially available nonwoven fabric (manufactured by Japan Vilene Co., Ltd., material: polypropylene, thickness: 0.10 mm, unit area weight: 40 g/m$^2$) was cut into a rectangular shape having a size larger than that of the coated portion C. As shown in FIG. 3, the coated portion C was sandwiched and covered from both sides with the obtained rectangular nonwoven fabric 16. At this time, the nonwoven fabric 16 covered the entirety of the coated portion C and extended from the four outer peripheral sides of the coated portion C to form a surplus region. The surplus region E was heat-welded and sealed (thermocompression bonded) so as to close all four outer peripheral sides of the coated portion C. This heat welding sealing was performed by heating the end portion of the nonwoven fabric 16 at a temperature of 150 to 200° C. for 1 second or longer using a commercially available heat seal bar. In the portion of the surplus region E that does not overlap with the uncoated portion U, the nonwoven fabrics 16 were directly heat-welded and sealed while the positive electrode current collector 12 not being sandwiched therebetween. On the contrary, in the portion of the surplus region E that overlaps with the uncoated portion U, the positive electrode current collector 12 was sandwiched with the nonwoven fabric 16 from both sides and heat-welded and sealed. In this way, the positive electrode structure 10 as shown in FIG. 4 was obtained.

The dimensions of each member shown in FIGS. 3 and 4 were as shown in Table 1.

TABLE 1

| | Dimension (mm) |
|---|---|
| Thickness $T_C$ of coated portion of positive electrode current collector filled with positive electrode active material | 0.70 |
| Thickness $T_N$ of nonwoven fabric | 0.10 |
| Thickness $T_U$ of uncoated portion | 0.10 |
| Length $L_U$ of uncoated portion | 30 |
| Width $W_S$ of welded portion in which nonwoven fabric is sealed while a positive electrode current collector being sandwiched therebetween | 5.5 |
| Thickness $T_S$ of welded portion in which nonwoven fabric is sealed while a positive electrode current collector being sandwiched therebetween | 0.20 |

As a result of a visual observation and a cross-sectional SEM observation of the obtained positive electrode structure, the following structure was confirmed.

It was confirmed that as shown in FIG. 2, in the portion in which the nonwoven fabric 16 was sealed while the positive electrode current collector 12 being sandwiched therebetween, the pores of the nickel foam constituting the positive electrode current collector 12 were filled with the polymer material constituting the nonwoven fabric 16.

It was confirmed that as shown in FIG. 4, in the portion of the surplus region E that overlapped with the uncoated portion U, there was a tapered cross-sectional shape which had a thickness decreasing from the coated portion C toward the uncoated portion U.

It was confirmed that as shown in FIG. 4, there was an unfilled region F between the coated portion C and the portion (side S') in which the nonwoven fabric 16 was sealed while the positive electrode current collector 12 being sandwiched therebetween, and in the unfilled region F, the pores of the nickel foam constituting the positive electrode current collector 12 were not filled with the polymer material or the positive electrode active material 14.

(2) Evaluation

The positive electrode structure produced in (1) above, the LDH separator below, and the negative electrode structure below were accommodated in a battery container so that the positive electrode structure and the negative electrode active material layer were separated from each other via the LDH separator.

Negative electrode structure: a structure in which a negative electrode active material layer containing metal zinc and zinc oxide powder together with a binder is pressure-bonded to copper expanded metal and is covered with a nonwoven fabric.

LDH separator: a separator pressed by filling up the pores of a porous substrate made of a polymer material (polyethylene) with LDH so as to exhibit hydroxide ion conductivity and gas impermeability.

The following liquid injection step, chemical conversion step, and drainage step were performed on the nickel-zinc secondary battery thus produced as a chemical conversion process.

Liquid injection step: a treatment was performed in which the electrolytic solution (5.4 mol % potassium hydroxide aqueous solution) was infiltrated into the positive electrode structure and the negative electrode structure. The amount of the electrolytic solution was set so that the entire laminated body was immersed, and by using the entire amount in two divided times, immersion under reduced pressure (−90 kPa) and immersion under open air were carried out.

Chemical conversion step: as a treatment for activating the positive electrode, charging and discharging were performed to depths of 80%, 100%, and 120% of the positive electrode mounting capacity.

Drainage step: after the chemical conversion step, the surplus electrolytic solution that was not absorbed by the positive electrode structure and the negative electrode structure was discharged from the injection port by reversing the battery by 180°.

<Quantification of Foreign Matter in Drainage>

The presence or absence of the positive electrode active material as a foreign matter in the drainage obtained in the above drainage step was examined. Specifically, the number of foreign matters in the filtration residue in the drainage was counted, and the number of foreign matters per unit volume was measured. This measurement was carried out using an X-ray foreign matter analyzer (EA8000, manufactured by Hitachi High-Tech Science Corporation) with the measurement size of the foreign matter set to 20 μm or more. The results were as shown in Table 2.

<Self-Discharge Characteristic Evaluation>

With respect to the produced nickel-zinc secondary battery, the remaining capacity ratio after storing for 30 days at a constant charge depth was calculated as the self-discharge rate based on the following equation. The results were as shown in Table 2.

Self-discharge rate=[(Initial charge capacity)−(Discharge capacity after storage)]/(Initial charge capacity)×100(%)

Comparative Example 1

Figure 5:
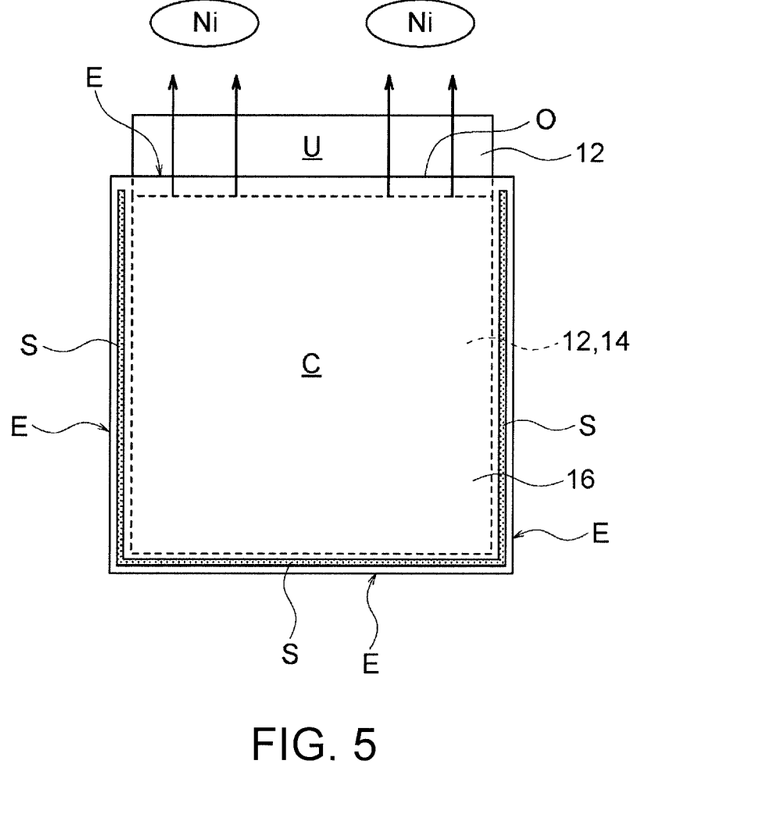
FIG. 5 is a front view showing a positive electrode structure of a comparative aspect in which only three outer peripheral sides S of a nonwoven fabric are sealed.

The production and evaluation of the positive electrode structure were carried out in the same manner as in Example 1 except that the surplus region E was heat-welded and sealed (thermocompression bonded) so as to close only three sides S of the four outer peripheral sides of the coated portion C (that is, the portion of the surplus region E that overlaps the uncoated portion (side O) was not heat-welded and sealed.) as shown in FIG. 5.

TABLE 2

| | Sealing side | Quantification of foreign matter in drainage Number of foreign matter per unit volume (per ml) | Self-discharge rate (%) |
|---|---|---|---|
| Example 1 | four sides sealed (all sides sealed) | 0 | 12 |
| Comparative Example 1 | three sides sealed (one side open) | 1.25 | 53 |

What is claimed is:

1. A positive electrode structure for a secondary battery, comprising:
   a positive electrode current collector composed of a tabular nickel foam and having a tabular coated portion and an uncoated portion extending from an outer peripheral portion of the coated portion;
   a positive electrode active material containing at least one selected from the group consisting of nickel hydroxide and nickel oxyhydroxide, the positive electrode active material being incorporated into the coated portion of the positive electrode current collector; and
   a nonwoven fabric made of a polymer material and covering the coated portion of the positive electrode current collector from both sides,
   wherein the positive electrode active material is not present in the uncoated portion of the positive electrode current collector, and
   wherein the nonwoven fabric covers an entirety of the coated portion and extends from the outer peripheral portion of the coated portion to form a surplus region, and the surplus region is sealed so as to close all around the outer peripheral portion of the coated portion,
   wherein in a portion of the surplus region that overlaps with the uncoated portion, the nonwoven fabric is sealed while the positive electrode current collector being sandwiched therebetween, and
   wherein in the portion in which the nonwoven fabric is sealed while the positive electrode current collector being sandwiched therebetween, pores of the nickel foam constituting the positive electrode current collector are filled with the polymer material derived from the nonwoven fabric in a molten and solidified state.

2. The positive electrode structure according to claim 1, wherein the portion in which the nonwoven fabric is sealed while the positive electrode current collector being sandwiched therebetween has a width of 1 to 10 mm.

3. The positive electrode structure according to claim 1, wherein the portion in which the nonwoven fabric is sealed while the positive electrode current collector being sandwiched therebetween has a thickness of 0.1 to 1.0 mm.

4. The positive electrode structure according to claim 1, wherein the positive electrode structure has an unfilled region between the coated portion and the portion in which the nonwoven fabric is sealed while the positive electrode current collector being sandwiched therebetween, and in the unfilled region, the pores of the nickel foam constituting the positive electrode current collector are not filled with the polymer material or the positive electrode active material.

5. The positive electrode structure according to claim 1, wherein in the portion of the surplus region that overlaps with the uncoated portion, the positive electrode structure has a tapered cross-sectional shape which has a thickness decreasing from the coated portion toward the uncoated portion.

6. The positive electrode structure according to claim 1, wherein in a portion of the surplus region that does not overlap with the uncoated portion, the nonwoven fabric is sealed while the positive electrode current collector not being sandwiched therebetween.

7. The positive electrode structure according to claim 1, wherein the sealing is a heat welding sealing.

8. The positive electrode structure according to claim 1, wherein the positive electrode current collector incorporating the positive electrode active material has a thickness of 0.2 to 2.0 mm.

9. The positive electrode structure according to claim 1, wherein the nonwoven fabric has a thickness of 0.05 to 0.2 mm.

10. The positive electrode structure according to claim 1, wherein the polymer material contains at least one of polyethylene and polypropylene.

11. The positive electrode structure according to claim 1, wherein the nickel foam is rectangular, and the nonwoven fabric covers the entirety of the coated portion and extends from four outer peripheral sides of the coated portion to form the surplus region, and the surplus region is sealed so as to close the four outer peripheral sides of the coated portion.

12. The positive electrode structure according to claim 1, wherein the secondary battery is a nickel-zinc battery.

13. A nickel-zinc secondary battery comprising:
the positive electrode structure according to claim 1,
a negative electrode structure containing a negative electrode active material layer containing at least one selected from the group consisting of zinc, zinc oxide, a zinc alloy, and a zinc compound;
an LDH separator containing a porous substrate made of a polymer material, and at least one selected from the group consisting of a layered double hydroxide (LDH) and an LDH compound that fills up pores of the porous substrate so as to exhibit hydroxide ion conductivity and gas impermeability; and
an electrolytic solution,
wherein the positive electrode structure and the negative electrode active material layer are separated from each other via the LDH separator.

14. A positive electrode structure for a secondary battery, comprising:
a positive electrode current collector composed of a tabular nickel foam and having a tabular coated portion and an uncoated portion extending from an outer peripheral portion of the coated portion;
a positive electrode active material containing at least one selected from the group consisting of nickel hydroxide and nickel oxyhydroxide, the positive electrode active material being incorporated into the coated portion of the positive electrode current collector; and
a nonwoven fabric made of a polymer material and covering the coated portion of the positive electrode current collector from both sides,
wherein the positive electrode active material is not present in the uncoated portion of the positive electrode current collector, and
wherein the nonwoven fabric covers an entirety of the coated portion and extends from the outer peripheral portion of the coated portion to form a surplus region, and the surplus region is sealed so as to close all around the outer peripheral portion of the coated portion, and
wherein in a portion of the surplus region that overlaps with the uncoated portion, the positive electrode structure has a tapered cross-sectional shape which has a thickness decreasing from the coated portion toward the uncoated portion.

15. The positive electrode structure according to claim 14, wherein in the portion of the surplus region that overlaps with the uncoated portion, the nonwoven fabric is sealed while the positive electrode current collector being sandwiched therebetween.

16. The positive electrode structure according to claim 15, wherein the portion in which the nonwoven fabric is sealed while the positive electrode current collector being sandwiched therebetween has a width of 1 to 10 mm.

17. The positive electrode structure according to claim 15, wherein the portion in which the nonwoven fabric is sealed while the positive electrode current collector being sandwiched therebetween has a thickness of 0.1 to 1.0 mm.

18. The positive electrode structure according to claim 15, wherein the positive electrode structure has an unfilled region between the coated portion and the portion in which the nonwoven fabric is sealed while the positive electrode current collector being sandwiched therebetween, and in the unfilled region, the pores of the nickel foam constituting the positive electrode current collector are not filled with the polymer material or the positive electrode active material.

19. The positive electrode structure according to claim 14, wherein in a portion of the surplus region that does not overlap with the uncoated portion, the nonwoven fabric is sealed while the positive electrode current collector not being sandwiched therebetween.

20. The positive electrode structure according to claim 14, wherein the sealing is a heat welding sealing.

21. The positive electrode structure according to claim 14, wherein the positive electrode current collector incorporating the positive electrode active material has a thickness of 0.2 to 2.0 mm.

22. The positive electrode structure according to claim 14, wherein the nonwoven fabric has a thickness of 0.05 to 0.2 mm.

23. The positive electrode structure according to claim 14, wherein the polymer material contains at least one of polyethylene and polypropylene.

24. The positive electrode structure according to claim 14, wherein the nickel foam is rectangular, and the nonwoven fabric covers the entirety of the coated portion and extends from four outer peripheral sides of the coated portion to form the surplus region, and the surplus region is sealed so as to close the four outer peripheral sides of the coated portion.

25. The positive electrode structure according to claim 14, wherein the secondary battery is a nickel-zinc battery.

26. A nickel-zinc secondary battery comprising:
the positive electrode structure according to claim 14,
a negative electrode structure containing a negative electrode active material layer containing at least one selected from the group consisting of zinc, zinc oxide, a zinc alloy, and a zinc compound;
an LDH separator containing a porous substrate made of a polymer material, and at least one selected from the group consisting of a layered double hydroxide (LDH) and an LDH compound that fills up pores of the porous substrate so as to exhibit hydroxide ion conductivity and gas impermeability; and
an electrolytic solution,
wherein the positive electrode structure and the negative electrode active material layer are separated from each other via the LDH separator.

* * * * *